Feb. 19, 1963 RENTARO SASAKI 3,078,349

PUSH BUTTON TYPE TELEPHONE CALLING DEVICE

Filed Aug. 31, 1960 4 Sheets-Sheet 1

INVENTOR

RENTARO SASAKI

BY Leon M. Strauss AGT.

INVENTOR
RENTARO SASAKI
BY Leon M. Strauss
Agt.

Feb. 19, 1963 RENTARO SASAKI 3,078,349

PUSH BUTTON TYPE TELEPHONE CALLING DEVICE

Filed Aug. 31, 1960 4 Sheets-Sheet 3

INVENTOR

RENTARO SASAKI

BY Leon M. Strauss

Agt.

Feb. 19, 1963 RENTARO SASAKI 3,078,349

PUSH BUTTON TYPE TELEPHONE CALLING DEVICE

Filed Aug. 31, 1960 4 Sheets-Sheet 4

INVENTOR

RENTARO SASAKI

BY Leon M. Strauss AGT.

United States Patent Office 3,078,349

Patented Feb. 19, 1963

3,078,349
PUSH BUTTON TYPE TELEPHONE CALLING DEVICE

Rentaro Sasaki, Tomioka City, Japan, assignor to Oki Electric Industry Company, Limited, Tokyo, Japan, a Japanese corporation Filed Aug. 31, 1960, Ser. No. 53,279
Claims priority, application Japan Sept. 16, 1959
8 Claims. (Cl. 179—90)

This invention relates to a push button type telephone calling device. More particularly it relates to a telephone calling device provided with push buttons for specific calling numbers in a telephone so that the other party may be directly called by pushing the buttons.

In accordance with the present invention, wiring plates of insulating material, which are printed with figure leads corresponding to the number of figure positions in a called telephone number, and with digit leads corresponding to the respective digits such as "0" through "9," are provided, and each wiring plate has an operating push button thereon. By depressing this push button, a particular wiring plate corresponding to a desired call number may be placed in electric circuit relation with a pulse generating distributor and a figure distributor, whereby the number represented by the particular wiring plate may be automatically dialed or called. This is effected by cooperation of the wiring plates with the distributors to provide a series of pulse groups, with each pulse group corresponding to one digit of the called number and the sequence of the pulse groups corresponding to the sequence of digits in the called number.

After the required number of pulses in each figure position have been sent out by the distributors, the pulse generator is short circuited or shunted. At the end of the sequence of pulse groups, the wiring plate, which has been depressed, is automatically released to be restored to its initial position. Thereby, any party may be called directly by pushing a push button marked or otherwise corresponding to the number of the called party.

An object of the present invention is to provide a telephone calling device whereby the called party can be directly called by operating a push button.

Another object of the present invention is to provide a push button type telephone calling device which is simple in construction and easy to operate.

A further object of the present invention is to provide a telephone calling device wherein, after the desired number of pulses in each pulse group have been transmitted, the pulse distributor is short circuited by means of wiring plates provided with selectively interconnected figure leads and digit leads.

For an understanding of the principles of the invention, reference is made to the following description of a typical embodiment thereof as illustrated in the accompanying drawings. In the drawings.

Figure 1:
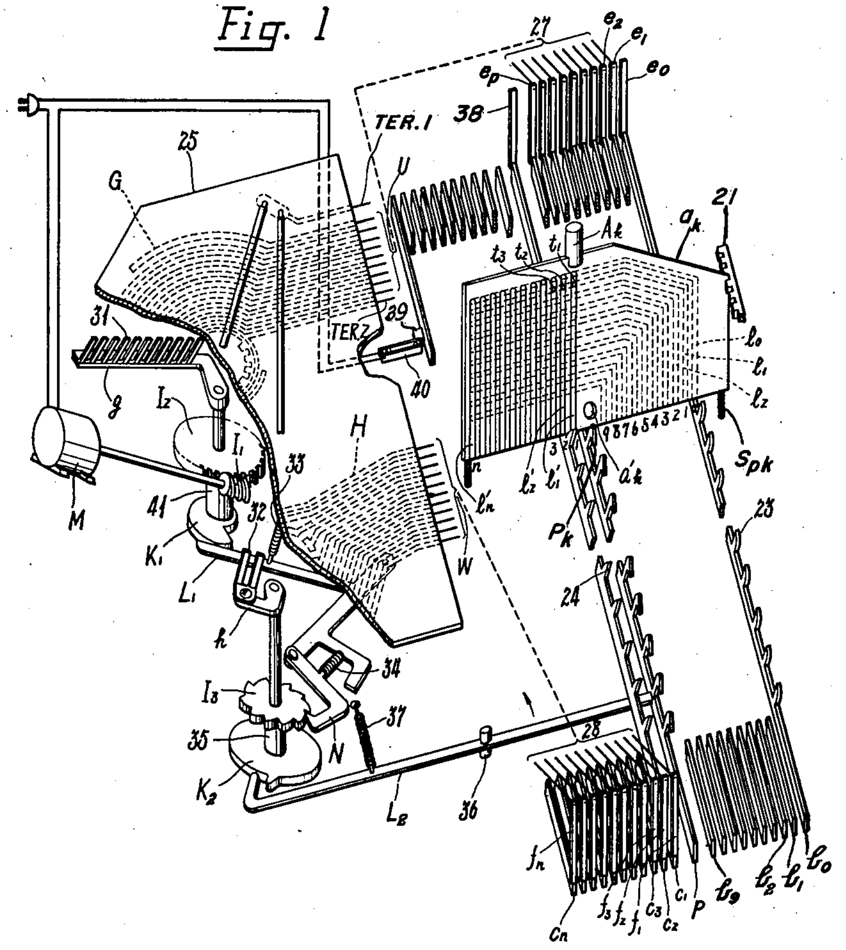
FIG. 1 is a part schematic wiring diagram and part broken perspective view illustrating the calling device of the invention.

Referring to the drawings, $a_1, a_2, a_3, \ldots a_k$ are wiring plates which are made of insulating material and on which digit lead wires $l_0, l_1, \ldots l_9$, including continuous conductors or leads having vertical and horizontal parallel sections at right angles, and figure lead wires $l'_1, l'_2, \ldots l'_n$ such as, for example, vertical parallel lines, are printed in mutually insulated relation on the front and back surfaces, respectively, the digit line surface being provided with ten lead wires representing the digits 0, 1, 2 . . . 9 and the figure surface being provided with lead wires of a number somewhat larger than the number of the figures or positions of commonly used call numbers such as 1,2,3, . . . *n*. The wiring plates are perforated at those intersections of the lead wires on said front and back surfaces corresponding to specific call numbers and the lead wires are directly interconnected by means of eyelets.

For example, in a wiring plate corresponding to a call number "111," the lead wire of the figure 1 and the lead wire of the digit 1 are connected with each other by means of an eyelet $t_1$, the lead wire of the figure 1 and the lead wire of the digit 2 are connected with each other by means of an eyelet $t_2$ and the lead wire of the figure 1 and the lead wire of the digit 3 are connected with each other by means of an eyelet $t_3$. As all the wiring plates are identical in structure except in the connecting positions of the lead wires, only one plate $a_k$ is shown in FIGURE 1.

Each wiring plate is vertically held by wall grooves 21 and 22 made of an insulating material and provided on both sides of a frame 20 made of an insulating material so as to be movable up and down along said wall grooves. Each wiring plate is continuous biased upwardly by a return spring $S_{pk}$. A push button $A_k$ is fixed to the top part of the wiring plate $a_k$ so that the wiring plate may be pushed down by the push button.

In the bottom part of the frame 20, as many digit levers $b_0, b_1, \ldots b_9$ as said digit lead wires $l_0, l_1, \ldots l_9$ are arranged at right angles to the wiring plate and are positioned in slits provided in said frame 20, and also as many figure levers $c_1, c_2 \ldots c_n$ as the figure lead wires $l'_1, l'_2 \ldots l'_n$ are arranged and positioned in the same manner as, and in parallel relation with, said digit levers. Leaf springs $e_0, e_1, \ldots e_9$ are pressed against the digit levers $b_0, b_1, \ldots b_9$ respectively, at one end and leaf springs $f_1, f_2 \ldots f_n$ are pressed against the figure levers $c_1, c_2 \ldots c_n$, respectively, at one end. As many projections 23 as the number of plates are provided to project from each digit lever. Similar projections 24 are also provided to project from each figure lever. Both projections 23 and 24 are so formed as to be directed reversely to each other. One lock plate P is provided in the middle between said digit levers and figure levers so as to be parallel with them, and is positioned by slits in the frame 20 and is pressed at one end by a leaf spring 38 provided in the frame 20. As many hooks $P_k$ as the number of wiring plates are provided to project from the lock plate P so as to be able to engage with holes $a'_k$ in the lower parts of the wiring plates.

When the wiring plates are pushed down by the push buttons $A_k$, the projections 23 of the digit levers $b_0, b_1, \ldots b_9$ and the projections 24 of the figure levers $c_1, c_2 \ldots c_n$ will be moved to left and right against the leaf springs $e_0, e_1 \ldots e_9$ and the leaf springs $f_1, f_2 \ldots f_n$, respectively, by the wiring plates, and a series connection will be made between the lead wires, corresponding to the specific figures and digits on the wiring plates, and the digit levers and figure levers. That is to say, if the call number is "111," the leaf spring $e_1$, digit lever $b_1$, lead wire $l_1$, eyelet $t_1$, lead wire $l'_1$, figure lever $c_1$, spring plate $f_1$, the leaf spring $e_1$, digit lever $b_1$, lead wire $l_1$, eyelet $t_2$, lead wire $l'_2$, figure lever $c_2$, leaf spring $f_2$ and the leaf spring $e_1$, digit lever $b_1$, lead wire $l_1$, eyelet $t_3$, lead wire $l'_3$, figure lever $c_3$, leaf spring $f_3$ will be connected in series. Further, as the wiring plates are pushed down, the holes $a'_k$ will engage with the hooks $P_k$ of the lock plate P. Unless the holes are disengaged by a later mentioned disengaging device, the wiring plates will remain fixed.

The respective terminals 27 of the leaf springs $e_0$, $e_1$ . . . $e_9$ and the respective terminals 28 of the leaf springs $f_1$, $f_2$ . . . $f_n$ are connected to the terminals U of pulse generating distributors G and the terminals W of figure distributors H, respectively, on the distributing plate 25 by the lead wires. The distributors G and H are made by printing insulated conductors or leads, of the desired number, on the undersurface of a distributing plate 25 of insulating material. The circuit is made and broken by sliding a slider $g$ having as many brushes 31 as the number of lead wires on said distributors G. Also the circuit is made and broken by sliding a slider $h$, having two brushes 32, on the distributors H.

The slider $g$ is rotated by a shaft 41 through a worm $I_1$ and a worm gear $I_2$, from a motor M. A cam $K_1$ is secured to the shaft 41. A lever $L_1$, pivoted at one end to the machine base, is kept in contact with the cam $K_1$ by a spring 33. The lever $L_1$ is provided at its other end with a pawl N pushed forward by a spring 34. The pawl N engages with a ratchet wheel $I_3$ provided on a shaft 35 to which are secured a cam $K_2$ and the slider $h$. A lever $L_2$ pivoted to the machine base at a pin 36, is so made as to be always in contact at one end with the cam $K_2$ and is loosely fitted at the other end to the lock plate P.

When the cam $K_1$ makes one rotation and the lever $L_1$ falls into the cam groove, the ratchet wheel $I_3$ will be advanced by one tooth by the pawl N of the lever $L_1$. Therefore, the slider $h$ of the distributors H will be moved by one figure per each rotation of the slider $g$ of the distributors G. When the scanning of any desired number of figures has been completed by the cam $K_2$, the lever $L_2$ will be moved in the direction indicated by the arrow and against the force or bias of spring 37 by the lobe of said cam $K_2$, the lock plate P will be retracted, the projection $P_k$ will be disengaged from the hole $a'_k$ of the wiring plate $a_k$ and therefore the wiring plate will be returned to the original position under the action of the spring $S_{pk}$.

Figure 2:
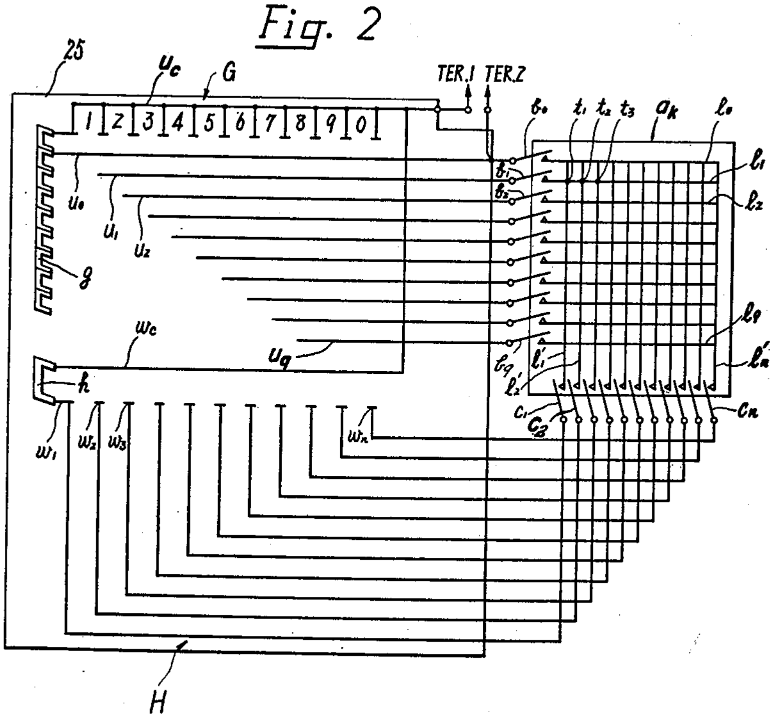
FIG. 2 is a schematic wiring diagram illustrating the operation of the invention calling device.
Figure 3:
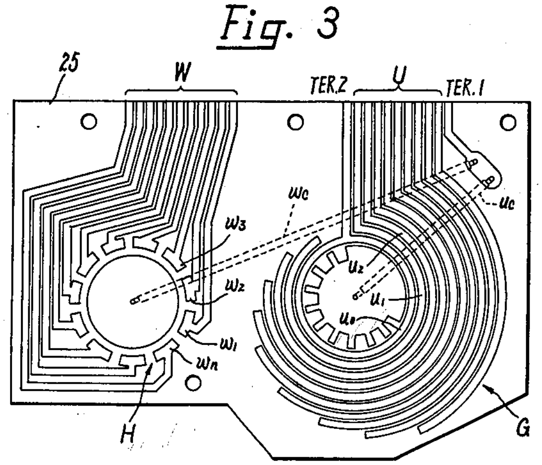
FIG. 3 is a plan view of the undersurface of a printed distributor plate.
Figure 4:
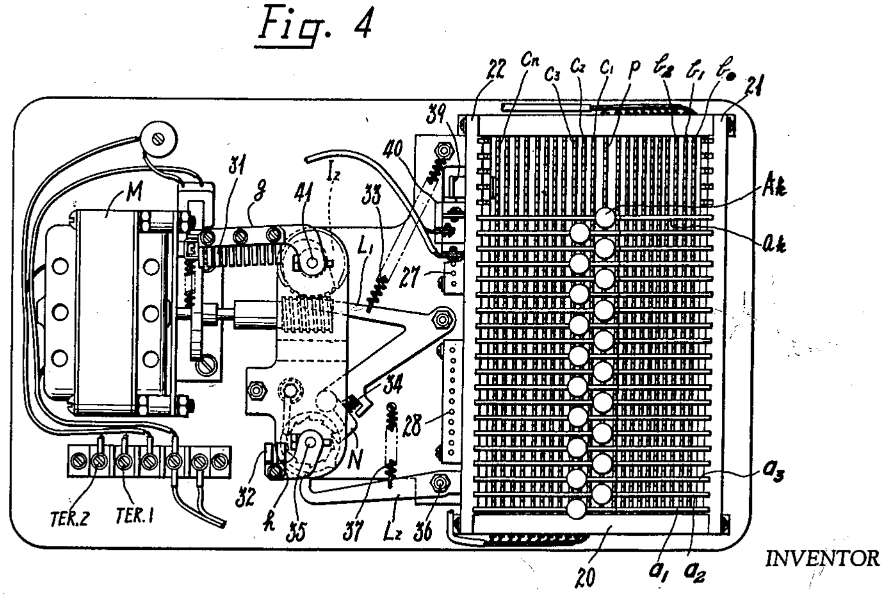
FIG. 4 is a plan view of the calling device, with the distributor plate removed.
Figure 5:
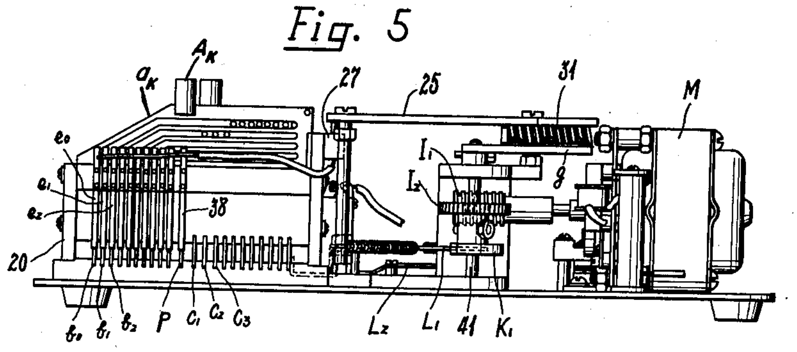
FIG. 5 is a right hand elevation view of the calling device of FIG. 4, with the distributing plate in position.
Figure 6:
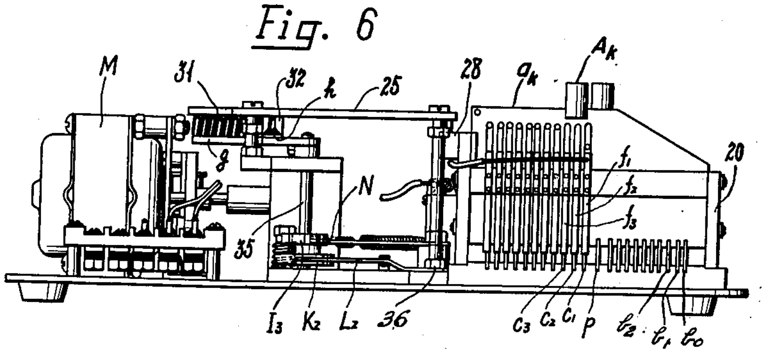
FIG. 6 is a left side elevation view of the calling device illustrated in FIG. 4.

The electric circuit of the call number "111" shall be considered with reference to FIGURE 2. In the drawing, the distributing plate 25 is shown as developed. On the wiring plate $a_k$, the figure lead wires and digit lead wires are connected in series at $t_1$, $t_2$ and $t_3$. First of all, as said call number begins with the first figure, the slider $h$ is in a position to connect lead wire terminals $w_1$ and $w_c$ of the first figure. Further, if the slider $g$ is considered to move toward the right end from the left end, after the circuit is cut once, a conductor $u_1$, connected to the digit 1, and a common conductor $u_0$, will be connected with each other to close a circuit. Meanwhile, one pulse will be emitted. However, when the conductor $u_1$ and a conductor $u_c$ are connected with each other, a circuit including the terminal 1, conductor $u_c$, conductor $u_1$, terminal 2 will be completed and, at the same time, a bypass of the terminal 1, common conductor $w_c$, conductor $w_1$, lever $c_1$, lead wire $l'_1$, eyelet $t_1$, lead wire $l_1$, lever $b_1$, conductor $u_1$, slider $g$, conductor $u_0$, terminal 2 will be formed. Therefore, by the motion of the slider $g$, the conductors $u_1$ and $u_c$ will be disconnected from each other once and the second pulse will be about to be emitted but, as the circuit has just been shorted by the formation of said by-pass circuit, no pulse will be emitted until the succeeding rotation is made. Therefore, first of all, one pulse of one figure will be emitted.

Next, for the second figure, with one rotation of the slider $g$, the slider $h$ will short-circuit the conductors $w_c$ and $w_2$. Therefore, this time, until a circuit consisting of the terminal 1, conductor $w_c$, conductor $w_2$, lever $c_2$, lead wire $l'_2$, eyelet $t_2$, lead wire $l_1$, lever $b_1$, conductor $u_1$, slider $g$, conductor $u_0$, terminal 2 is formed, a number of pulses equal to the number of the cuts between the common conductor $u_c$ and the leading end of the other conductor will be emitted. That is to say, in such case, it will be 1. In exactly the same manner, a pulse corresponding to "1" in the third figure can be emitted. Thus the pulse signs of "111" can be emitted. Therefore, the bell of the telephone of the other party will be rung to call the other party so that both parties may talk through the telephones.

In the case of the digit "0," ten pulses will be emitted and therefore no connection will be made through the eyelets on the wiring plate. But, when no pulse is emitted at all, the lead wire $l_0$ will be short-circuited through the eyelet. This is used to idle an excess four or three figures because eleven figures are set and only seven or eight figures are used in the usual practice.

In operating the device of the present invention, when a predetermined wiring plate corresponding to a desired call number is pushed down by means of a push button, a switch 40 will be closed through a small lever 39 fixed to any digit lever or figure lever and, as said switch is connected with an electric source and motor M in series, the motor will start and the above mentioned operation will begin. When the generation of the pulses has been completed and the other party has been called, as described above, the wiring plate will be released from the projection of the lock lever and will be returned, and therefore the digit levers and figure levers will all return to the original positions. Thus, the small lever 39 will also separate from the switch 40 and the latter will open to disconnect the electric source. Then the motor will stop and the motion of the whole device will stop.

While the plates $a$ have been referred to as "wiring plates," it will be appreciated that these plates may also be referred to as "calling plates" or "dialing plates." Another term which would be appropriate to designate the plates $a$ would be "switch plates."

While a specific embodiment of the invention has been shown and described to illustrate the application of the principles of the invention, it will be understood that the invention may be embodied otherwise without departing from such principles.

I claim:

1. A push button type telephone calling device comprising, in combination, a calling plate of insulating material having printed, on one surface thereof, a number of electrically conductive digit leads corresponding to the number of digits and arranged in digit sequence and, on the other surface thereof, a number of electrically conductive figure leads at least equal to the number of figure positions in a telephone designation; each digit lead intersecting, but being normally insulated from, each figure lead; whereby, for each figure position, there is an intersection corresponding to each digit; connecting means at each intersection of a respective figure lead, corresponding to a respective figure position of a called number, with the respective digit lead corresponding to the digit in such respective figure position, electrically interconnecting the respective figure lead with the respective digit lead; means mounting said plate for movement between inoperative and operative positions, means biasing said plate to its inoperative position; plate operating push button means on said plate; digit distributing means; figure distributing means; switch means operable responsive to movement of said plate to its operative position to connect each digit lead to said digit distributing means and to connect each figure lead to said figure distributing means; said digit distributing means comprising cyclically operable first scanning means operative to scan sequentially the digit leads connected to said digit distributing means by operation of said switch means, and operative at each digit lead scanning position, momentarily to close a respective single pulse emitting circuit including the respective digit lead; said figure distributing means comprising a second scanning means stepped, at the end of each cycle of said first scanning means, to scan sequentially the figure leads connected to said figure distributing means by operation of said switch means; each interconnected digit lead and figure lead, when scanned by respective scanning means, completing a shunt circuit for said pulse emitting circuit and maintaining said shunt circuit completed until the end of the respective cycle of said first scanning means; whereby the number of pulses emitted during each cycle of said first scanning means corresponds to the digit number of the respective figure position then scanned by said second scanning means; latch means operable, responsive to movement of said plate to its operative position, to latch said plate in its operative position; and means operable by said second scanning means, at the end of its scanning cycle, to release said latch means.

2. A push button type telephone calling device, as claimed in claim 1, in which said digit leads include first substantially parallel sections extending in spaced parallel relation to each other substantially normal to an edge of said plate; said figure distributing leads being arranged in spaced parallel relation normal to said one edge of said plate; said digit leads further including second sections extending, in spaced parallel relation, substantially perpendicularly to said first sections and intersecting each of said figure leads.

3. A push button type telephone calling device, as claimed in claim 1, in which said connecting means comprises conductive eyelets.

4. A push button type telephone calling device, as claimed in claim 1, in which said digit distributing means comprises a plate having sequentially positioned digit terminals each electrically connected to a respective digit lead by operation of said switch means; said digit distributing means further including a circuit closer effective, in each digit lead position, to connect the respective digit lead momentarily to said pulse emitting circuit for emission of a pulse.

5. A push button type telephone calling device, as claimed in claim 4, in which said pulse emitting circuit further includes a common conductor spaced from said circuit closer and having pulse terminals projecting into the path of movement of said circuit closer for engagement thereby during each cycle of operation thereof.

6. A push button type telephone calling device, as claimed in claim 1, in which each of said scanning means is rotatable; and a stepping means interconnecting said first scanning means and said second scanning means and operable by said first scanning means at the completion of the cycle of operation thereof, to advance said second scanning means by one step.

7. A push button type telephone calling device, as claimed in claim 1, in which there are a plurality of said calling plates; a base having guide means to receive each of said calling plates for movement between its inoperative and operative positions; electrically conductive levers extending generally normal to the plane of said plates and normally biased to a retracted position, and including a set of digit levers and a set of figure levers; each plate, when depressed by operation of said push button means, moving all of said levers from their retracted positions to their operative positions; and respective switch contacts closed by each movement of one of said levers to its operative position.

8. A push button type telephone calling device, as claimed in claim 7, including a latch lever disposed between the set of digit levers and the set of figure levers and constituting said latch means.

References Cited in the file of this patent

UNITED STATES PATENTS

| | | |
|---|---|---|
| 2,386,609 | Hubbard | Oct. 9, 1945 |
| 2,505,069 | Savino | Apr. 25, 1950 |
| 2,598,695 | Hill et al. | June 3, 1952 |
| 2,932,816 | Stiefel et al. | Apr. 12, 1960 |